United States Patent [19]

Léman

[11] Patent Number: 5,200,997
[45] Date of Patent: Apr. 6, 1993

[54] INTERNAL AUXILIARY FRAME FOR HAND TELEPHONE

[75] Inventor: Ari Léman, Pertteli, Finland

[73] Assignee: Nokia Mobile Phones Ltd., Salo, Finland

[21] Appl. No.: 676,881

[22] Filed: Mar. 28, 1991

[30] Foreign Application Priority Data

Apr. 12, 1990 [FI] Finland ................................. 901887

[51] Int. Cl.⁵ ........................ H04M 1/00; H04B 1/46; H04B 1/38
[52] U.S. Cl. ................................. 379/428; 379/419; 455/82; 455/90
[58] Field of Search ................ 379/56, 58, 419, 428; 455/79, 82, 89, 90

[56] References Cited

U.S. PATENT DOCUMENTS

| | | | |
|---|---|---|---|
| 4,257,121 | 3/1981 | Henderson et al. | 455/89 |
| 4,471,493 | 9/1984 | Schober | 455/90 |
| 4,641,366 | 2/1987 | Yokoyama et al. | 455/89 |
| 5,014,346 | 5/1991 | Phillips et al. | 455/89 |

FOREIGN PATENT DOCUMENTS

| | | | |
|---|---|---|---|
| 2488465 | 2/1982 | France | 455/90 |
| 0288627 | 12/1986 | Japan | 455/90 |
| 0114425 | 5/1988 | Japan | 455/82 |

Primary Examiner—Curtis Kuntz
Assistant Examiner—William Cumming
Attorney, Agent, or Firm—Darby & Darby

[57] ABSTRACT

An auxiliary frame to be detachably fastened inside a hand-held telephone for mounting at least some of the components of the hand telephone, has a lower edge with separate indentations for receiving power supply contacts and for securing them between the auxiliary frame and the attachment base of the hand-held telephone, e.g., a circuit board. Another indentation is provided at the lower edge for receiving the signal conductor of the external antenna of the telephone and for securing the signal conductor between the auxiliary frame and the attachment base. The upper surface of the auxiliary frame is designated for supporting the internal disc antenna of the telephone, which antenna is secured to the upper surface in abutting relationship therewith.

6 Claims, 2 Drawing Sheets

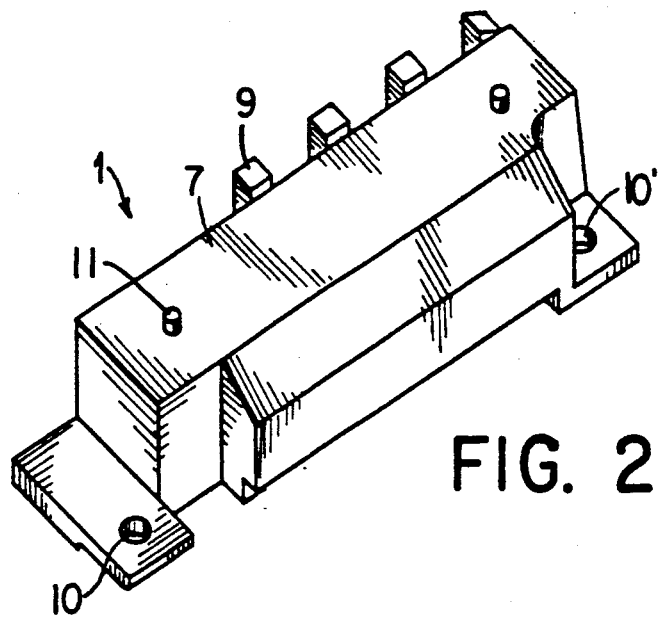
FIG. 2
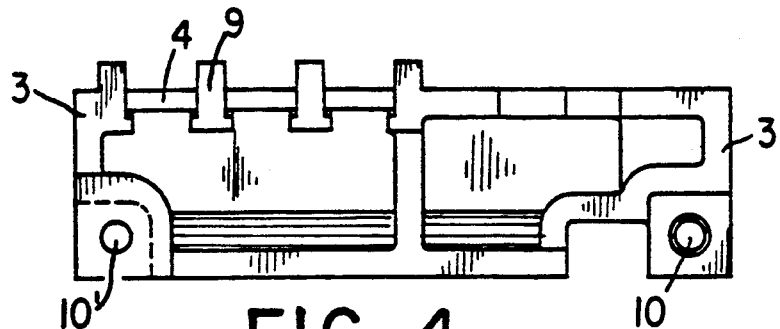
FIG. 4
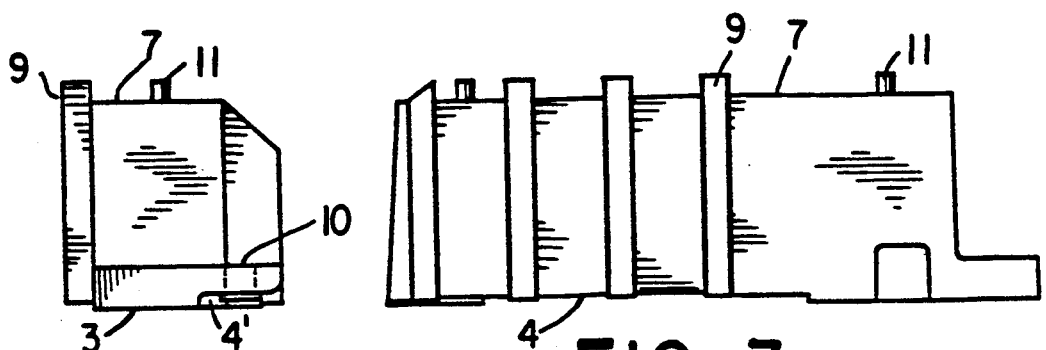
FIG. 5
FIG. 3

INTERNAL AUXILIARY FRAME FOR HAND TELEPHONE

BACKGROUND OF THE INVENTION

This invention applies to an auxiliary frame for a hand-held telephone and specifically to an essentially non conductive auxiliary frame to be detachably fastened inside the hand-held telephone.

A hand-held telephone comprises a number of different components, such as an accumulator or batteries with contacts, internal disc antenna, external antenna, circuit board or circuit boards, and a radio frequency component, all directly or indirectly fastened to the frame of the phone in various ways. Previously these components have been fastened through a number of separate components. For example, the accumulator or battery contacts have their own frame or circuit boards, disc antennas have separate attachment towers or frames and the signal conductor of the external antenna is usually attached to the radio frequency component be a coaxial cable and contactors. The drawback of these previously known designs is the large number of separate components, which makes assembling difficult and time-consuming, and therefore expensive.

SUMMARY OF THE INVENTION

The purpose of the invention in question is to overcome the aforementioned drawbacks and to provide an essentially non-conductive auxiliary frame to be detachably fastened inside the hand-held telephone. The accumulator or battery contacts and the internal disc antenna clamp, which also functions as a signal conductor, can be attached to this frame so that a structure as compact as possible, and which is cheap and easy and fast to install, is provided.

According to the invention this is accomplished with an auxiliary frame which has separate indentations for receiving each contact of the power supply, on one hand, and the signal conductor of the external antenna, on the other hand, and for pressing them between the auxiliary frame and the base, which comprises the earth plane. The opposite upper surface of the auxiliary frame is designed to support and fasten the internal disc antenna set against it.

On the outer and the inner walls of the auxiliary frame, on both sides of the aforementioned indentations for each contact, there are projections to receive and separate u-shaped contacts.

The indentation that goes against the earth plane and receives the signal conductor can also have a hole to fasten the auxiliary frame, and thus also the signal conductor, to the base with a screw or bolt for example.

The support surface of the disc antenna, on the other hand, can have pins, which fit into the holes in the disc antenna to fasten it to the auxiliary frame. Part of the support surface can also be wedged.

BRIEF DESCRIPTION OF THE DRAWINGS

The invention is described in detail in what follows with reference to the attached FIG. where FIG. 2 is perspective view of a detached auxiliary frame, and FIGS. 3, 4 and 5 present the auxiliary frame in FIG. 2 from the side, bottom and end view, respectively.

DETAILED DESCRIPTION OF THE PREFERRED EMBODIMENTS

Figure 1:
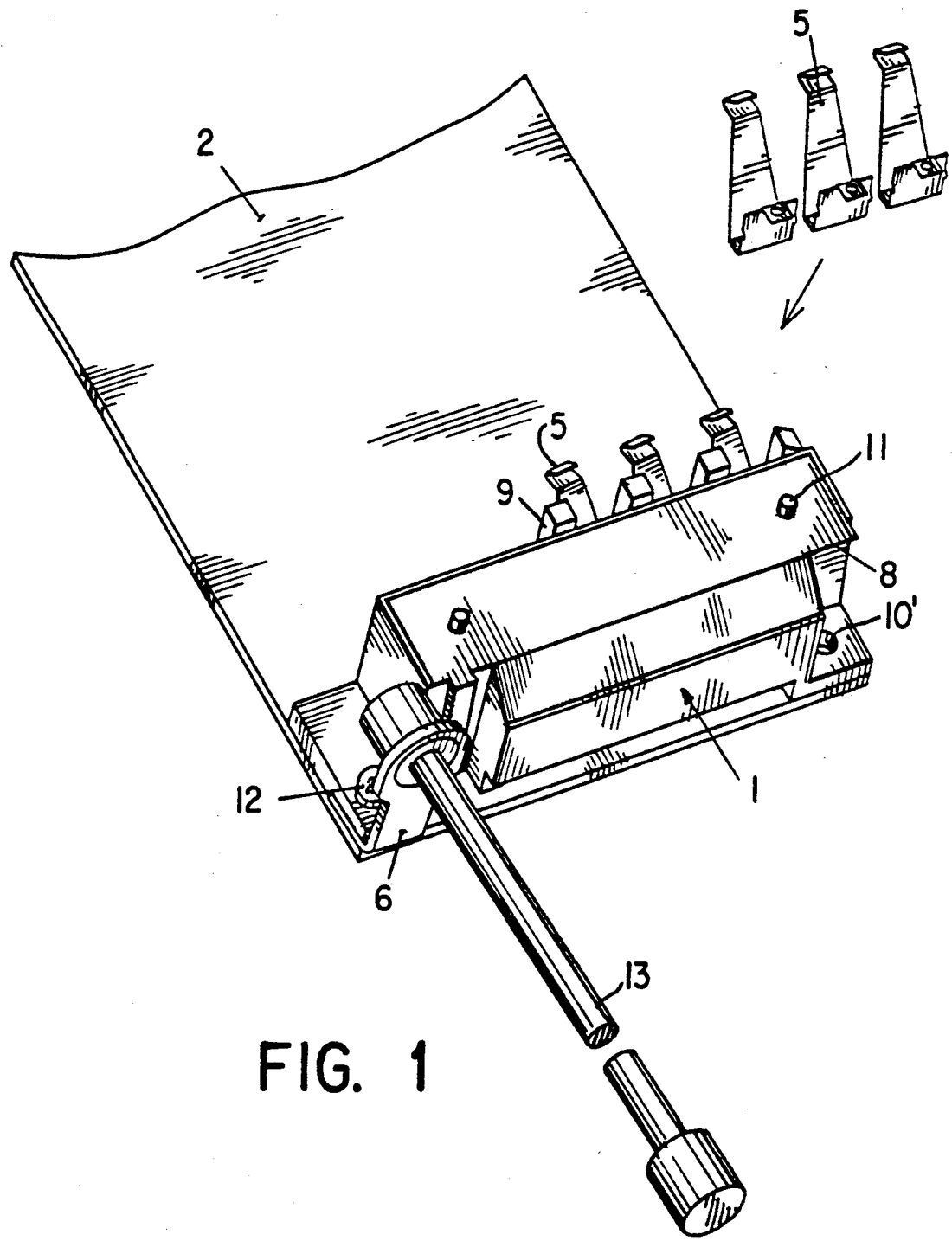
FIG. 1 is a perspective view of an installed auxiliary frame.

In FIG. 1 the auxiliary frame of the invention is generally referred to with numeral 1 and it is partly fastened to the circuit board 2 with a screw 12. On the accumulator or battery side wall of the auxiliary frame 1 three electric contacts 5 have been fitted. They have also been pictured separately in FIG. 1. The electric contacts have been bent into a u-shape, so that their web is pressed between the lower edge of the auxiliary frame 1 and the circuit board 2. The electronic contacts 5 are also separated by essentially horizontal pillar-like projections 9.

The clamp of the external antenna 13, which also functions as a signal conductor 6, is also pressed between the lower edge of the auxiliary frame 1 and the circuit board 2 and is locked to the frame with fastening screw 12 as FIG. 1 shows.

The disc antenna 8 on the other hand is fitted against the upper surface of the auxiliary frame and locked with pins 11 located on the said upper surface, which pins fit into holes located correspondingly on the disc antenna. The auxiliary frame 1 functions thus as an insulator between the earth plane of the circuit board 2 and the disc antenna, fastening the disc antenna at a constant distance from the earth plane.

The auxiliary frame 1 also has another fastening hole 10' to fasten it to the the circuit board.

As FIGS. 3 and 4 show in detail, the auxiliary frame 1 has separate indentations 4 and 4' on the lower edge 3 which is in contact with the circuit board, so that the indentations 4 are on the lower edge 3 on the accumulator or battery side wall of the auxiliary frame 1. The height of the indentation 4 is essentially the same as the thickness of the electric contacts 5, so that these are pressed tightly between the auxiliary frame 1 and the circuit board 2. As FIG. 4 shows in detail, the auxiliary frame is hollow inside and open at the bottom. On both ends of the auxiliary frame, there are flanges, which have holes 10 and 10', respectively, to fasten the auxiliary frame to the circuit board 2. On the lower edge 3 the flange at hole 10 has the indentation 4' to receive the signal conductor 6 of the external antenna 13 and to press it between the auxiliary frame 1 and the circuit board 2 by tightening the screw 12. Around the hole 10 the indentation 4' has a rim, which insulates the fastening screw 12 from the signal conductor 6.

The upper surface of the auxiliary frame is generally marked with reference numeral 7 and this upper surface can, as FIGS. 2 and 5 show in detail, be partly wedge-shaped. This upper surface 7 supports disc antenna 8, which is set against it, and has two pins 11 that fit in the corresponding holes in the disc antenna to fasten it to the upper surface 7 at a constant distance from the earth plane of the circuit board 2.

According to the invention the auxiliary frame is very easy to manufacture by injection moulding of plastic in a single phase of work, but it can also be made of some other non-conducting material. The auxiliary frame of the invention is thus very cheap and it is easy and fast to install. Attaching the required number of various components is also easy. A solid auxiliary frame is also more stable than one made of several components, and in production one saves in tools and serial production costs.

I claim:

1. A substantially non-conductive auxiliary frame for location on an attachment base for supporting power contacts, an external antenna having a signal conductor, and an internal disc antenna inside a hand-held telephone, said auxiliary frame comprising:
   a lower edge for engaging the attachment base and having at least one first indentation for receiving at least one of the power supply contacts and a second indentation for receiving the signal conductor of the external antenna, the power supply contacts and the signal conductor being pressed between the lower edge of said auxiliary frame and the attachment base when the auxiliary frame engages the attachment base; and
   an upper surface of such auxiliary frame for supporting the internal disc antenna.

2. An auxiliary frame as set forth in claim 1, wherein the attachment base is a circuit board of the hand-held telephone.

3. An auxiliary frame as set forth in claim 1, wherein there are first indentations for each power supply contacts and further comprising projections provided on opposite sides of said first indentations for separating the power supply contacts.

4. An auxiliary frame as set forth in claim 1, wherein said second indentation has an opening for fastening said auxiliary frame to the attachment base by attachment means.

5. An auxiliary frame as set forth in claim 4, wherein in the attachment means is a screw passing through the opening into the attachment base.

6. An auxiliary frame as set forth in claim 1, further comprising pins provided on said upper surface of the auxiliary frame and matching holes in the internal disc antenna for attaching the internal disc antenna to said upper surface.

* * * * *